Patented Mar. 30, 1937

2,075,653

UNITED STATES PATENT OFFICE 2,075,653

METHOD OF STABILIZING ALCOHOLIC BEVERAGES

Allen G. Libbey, Somerville, Mass.

No Drawing. Application October 26, 1935, Serial No. 46,933

12 Claims. (Cl. 99—48)

My invention relates to the stabilization of alcoholic beverages, particularly, but not exclusively, wines, and will be best understood from the following description of a method of practising the invention, the scope of which latter will be more particularly pointed out in the appended claims.

Alcoholic beverages not subject to distillation, such as wines, beers and ales, are commonly deleteriously affected by changes in atmospheric temperature and exposure to light. Under such conditions the beverages lose their clearness and brilliance, commonly accompanied by the formation of a sediment or cloud which cannot be prevented by filtration. This is believed to be due to the effect of the presence in the beverages of heavy metals such as iron, aluminum and copper, and metals of the alkaline earth group such as, for example, calcium, but particularly iron, these metals commonly existing in the form of organic compounds.

It has been found that the beverages may be stabilized, in respect to preventing the above mentioned deleterious effects, by treating them, preferably after fermentation and before aging, with water soluble sodium hexa metaphosphate, commonly assumed to have the formula $Na_2(Na_4P_6O_{18})$. This salt may be prepared by fusing the insoluble commercial metaphosphate and chilling the molten mass to produce a highly soluble glass-like product, which latter may be broken up or ground and dissolved in water, or preferably dissolved in a small fraction of the beverage to be treated so as not to add water to the beverage when the salt is added. In some instances when commercial materials are employed the salt may contain a small percentage of soda ash, sodium bicarbonate, sodium pyrophosphate, and the like, which however do not interfere with the efficacy of the salt.

The exact nature of the action of the sodium hexa metaphosphate is not definitely known. It is assumed however that it forms complex salts with the metals in the beverage and thus prevents a reaction between these metals and the tannins and the like commonly present in alcoholic beverages, particularly wines. Nevertheless, ordinarily it has been found that the amount of salt used to stabilize the beverage, particularly with wines, is more than that which is necessary to react in stoicheiometrical proportions with the amount of iron present, and thus it is possible that the salt reacts not only with the organo-iron complex but with other compounds such as calcium salts which form stable soluble compounds.

Ordinarily the addition of about 0.25 gram of sodium hexa metaphosphate per gallon of beverage will insure the desired results, but the amount may range from 0.1 to 1 gram of the salt per gallon of beverage depending upon the susceptibility of the beverage to lose its brilliance and to cloud.

After the addition of the sodium hexa metaphosphate to the beverage, particularly to wines, best results will be secured by agitating the liquid by any suitable means, such as stirring it mechanically. Ordinarily in from 12 to 18 hours after adding the salt a precipitate will be formed which may be removed from the beverage by filtration. This precipitate consists of albumen and other proteids with possible iron compounds which may be present in the form of ferric compounds in the original beverage. However, commonly all the iron, and in all usual cases the bulk of the iron, in the beverage is in the form of ferrous compounds, and these with the bulk of the other metallic compounds present are not precipitated but remain in the beverage and are stabilized, as above explained, so that they will not precipitate upon aging of the beverage or its exposure to light.

After the above described treatment of alcoholic beverages, containing iron or the other metals mentioned, it has been found that the beverages may be stored and shipped with assurance that no discoloration, or formation of the cloud or haze characteristic of alcoholic beverages containing iron, will occur.

It will be understood that wide deviations may be made from the form of the invention above described without departing from the spirit of the invention.

I claim:

1. The method of stabilizing fermented alcoholic beverages having a metal content which comprises treating the beverage with sodium hexa metaphosphate.

2. The method of stabilizing fermented alcoholic beverages having a metal content which comprises treating the beverage with from 0.1 to 1 gram sodium hexa metaphosphate per gallon of the beverage.

3. The method of stabilizing fermented alcoholic beverages having a metal content which comprises treating the beverage with from 0.1 to 1 gram sodium hexa metaphosphate per gallon of the beverage, and removing the precipitate formed by such treatment.

4. The method of stabilizing fermented alcoholic beverages having a metal content which comprises adding to the beverage a solution of sodium hexa metaphosphate in a like beverage in amount to treat the total beverage with from 0.1 to 1 gram sodium hexa metaphosphate per gallon of the total beverage.

5. The method of stabilizing fermented alcoholic beverages having a metal content which comprises adding to the beverage a solution of sodium hexa metaphosphate in a like beverage in amount to treat the total beverage with from 0.1 to 1 gram sodium hexa metaphosphate per gallon of the total beverage, and removing the precipitate formed by such treatment.

6. The method of stabilizing wines having an iron content which comprises treating the wine with sodium hexa metaphosphate.

7. The method of stabilizing wines having an iron content which comprises treating the wine with from 0.1 to 1 gram sodium hexa metaphosphate per gallon of the wine.

8. The method of stabilizing wines having an iron content which comprises treating the wine with from 0.1 to 1 gram sodium hexa metaphosphate per gallon of the wine, and removing the precipitate formed by such treatment.

9. The method of stabilizing wines having an iron content which comprises treating the wine with sodium hexa metaphosphate, and removing the precipitate formed by such treatment.

10. The method of stabilizing wines having an iron content which comprises adding to the wine a solution of sodium hexa metaphosphate in a like wine in amount to treat the total wine with from 0.1 to 1 gram sodium hexa metaphosphate per gallon of the total wine.

11. The method of stabilizing wines having an iron content which comprises adding to the wine a solution of sodium hexa metaphosphate in a like wine in amount to treat the total wine with from 0.1 to 1 gram sodium hexa metaphosphate per gallon of the total wine, and removing the precipitate formed by such treatment.

12. The method of stabilizing wines having an iron content which comprises adding to the wine from 0.1 to 1 gram sodium hexa metaphosphate per gallon of the wine, agitating the wine, and filtering it to remove the precipitate formed.

ALLEN G. LIBBEY.